Patented Nov. 11, 1930

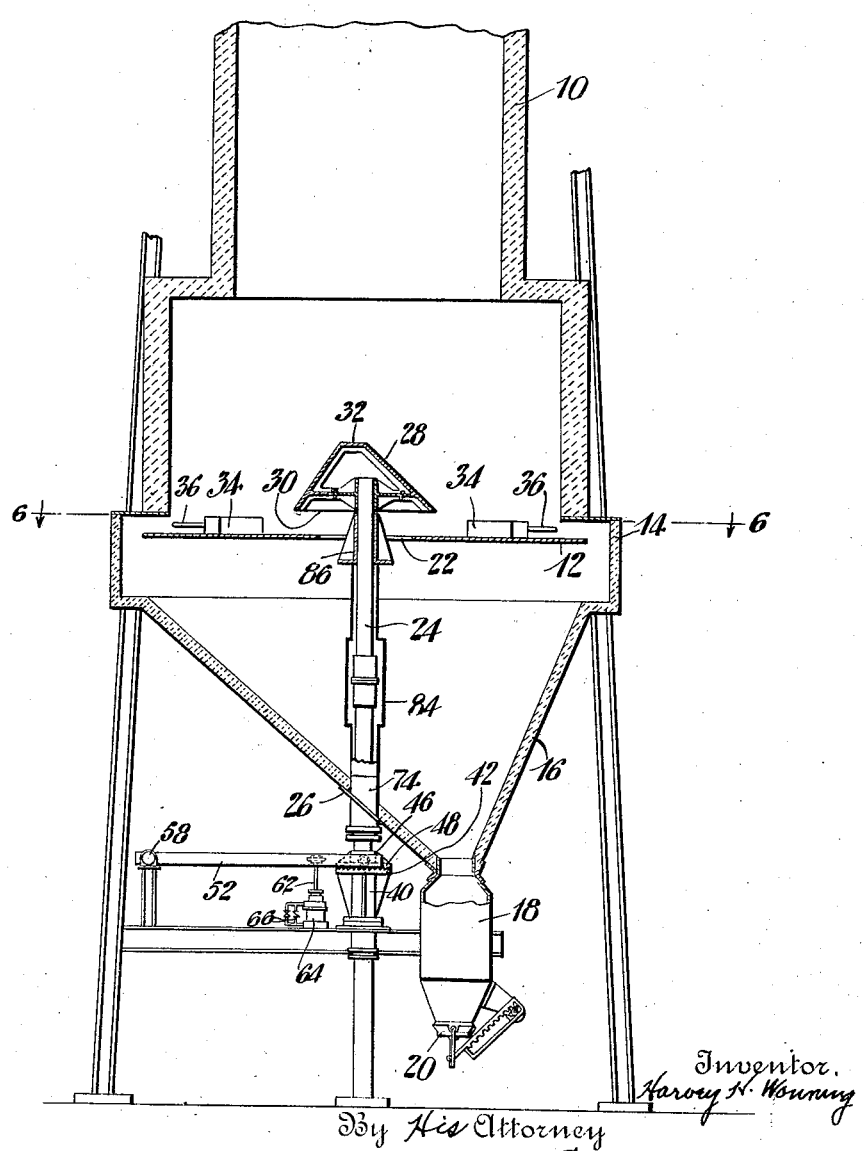

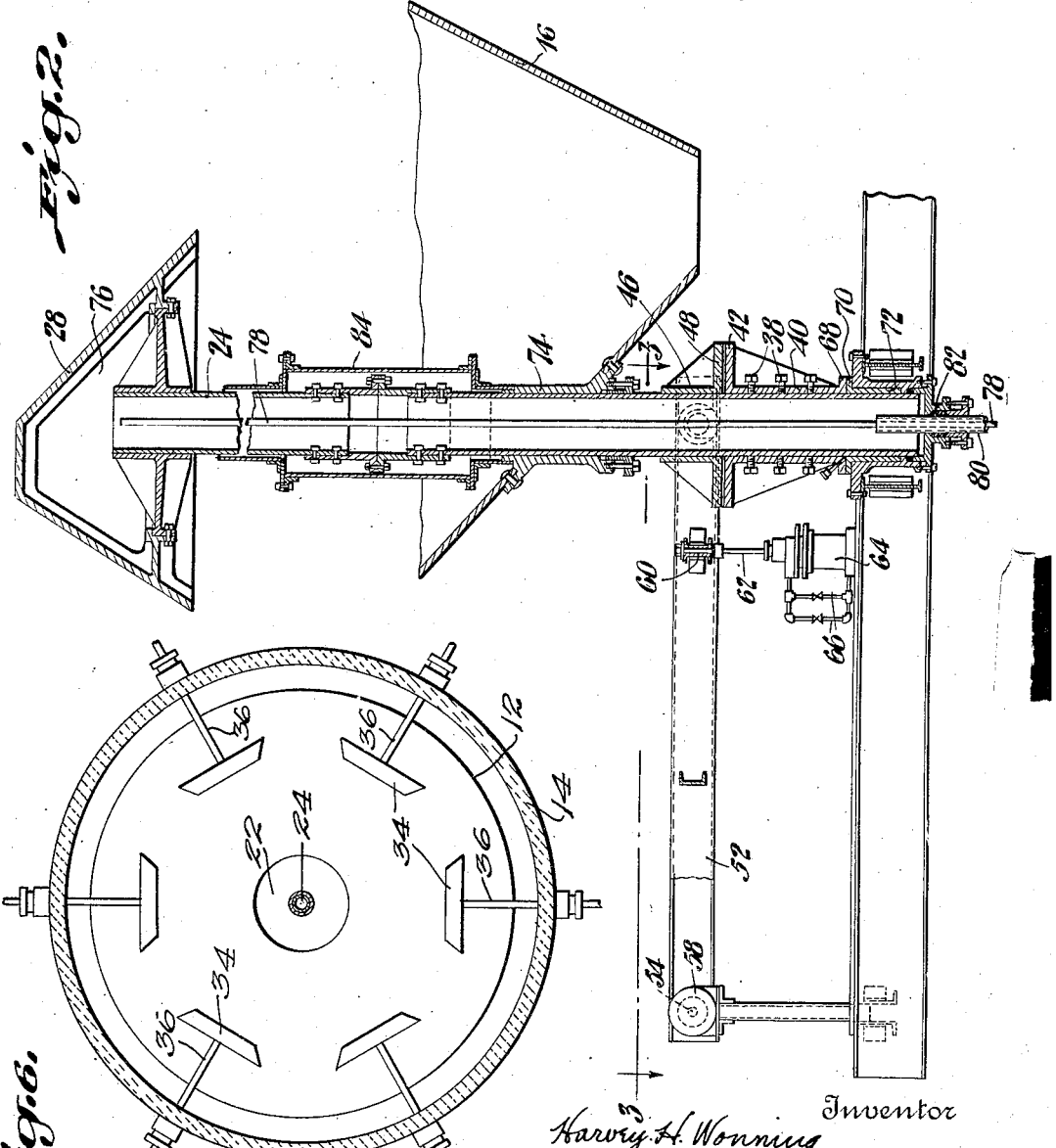

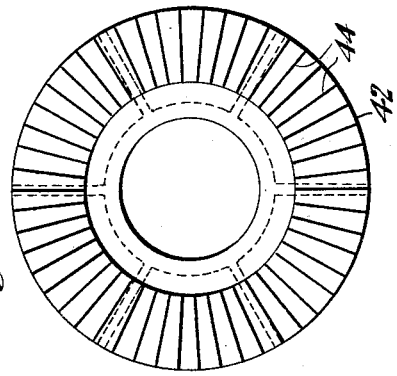
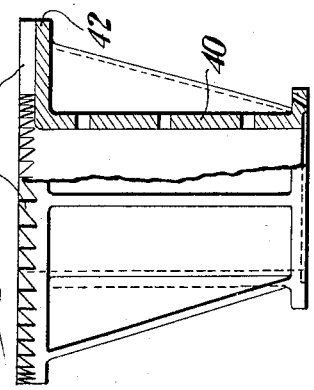
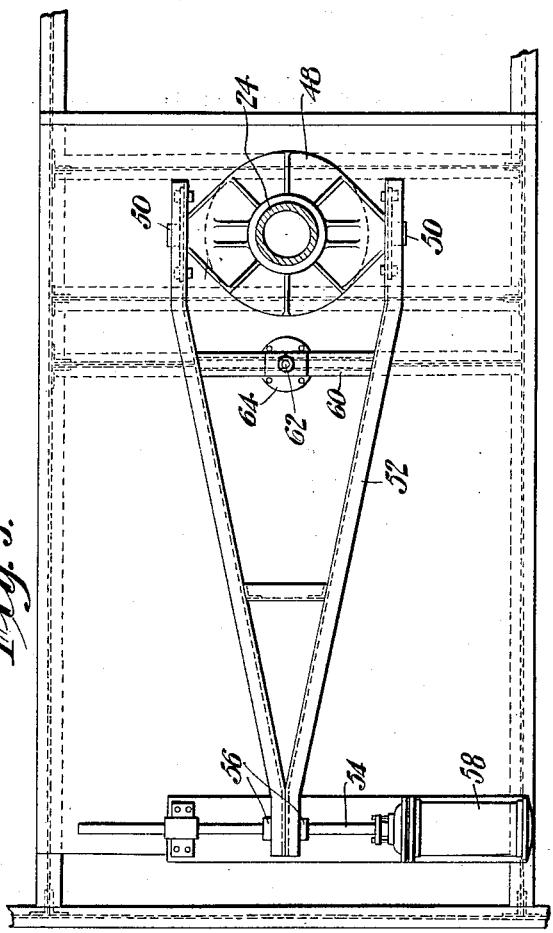

1,781,040

UNITED STATES PATENT OFFICE

HARVEY H. WONNING, OF BATESVILLE, INDIANA, ASSIGNOR TO COMBUSTION UTILITIES CORPORATION, OF NEW YORK, N. Y., A CORPORATION OF MAINE

DISCHARGE CONE FOR GAS GENERATORS

Application filed December 12, 1925. Serial No. 74,934.

The present invention relates to discharging apparatus and more particularly to the apparatus for discharging ash and fuel from a gas generator.

A type of gas generator is in present use having the general form of a shaft furnace, the shell of the generator being comparatively tall. Fuel is fed into the shell of such a generator at the top and coke and ash are removed at the bottom. Owing to the height of the column of fuel in the shell, however, the material near its bottom is under considerable pressure caused by the weight of coke and fuel above the point or plane at which coke is to be removed and difficulty has been experienced in obtaining a uniform feed through the generator.

It is the principal object of the present invention to provide a mechanism adapted to remove coke or like material from the lower end of a shaft generator and which shall be relatively simple, effective, and reliable but inexpensive to manufacture and install.

Further objects and advantages of the present invention will be evident to those skilled in the art from the following description taken in connection with the accompanying drawings, in which:

Fig. 1 is a central vertical section through the lower end of a gas generator of the shaft type which is provided with a discharge apparatus according to the present invention;

Fig. 2 is a sectional view similar to Fig. 1 of the discharge apparatus illustrated in Fig. 1 but on an enlarged scale and omitting substantially all of the generator parts;

Fig. 3 is a plan view taken on the line 3—3 of Fig. 2 showing the driving mechanism for the discharge apparatus;

Fig. 4 is a plan view of the lower ratchet member illustrated in Figs. 1, 2 and 3;

Fig. 5 is an elevation, partly broken away and partly in section of the ratchet member illustrated in Fig. 4;

Fig. 6 is a plan view taken on the line 6—6 of Fig. 1 showing the pusher members of the discharge apparatus.

In the drawing, 10 indicates the shell of a gas generator at the lower end of which is a horizontal discharge plate 12 serving as a support for the body of coke and fuel in the shell above it. Below the shell 10 of the generator proper is a discharge section 14 the lower end of which is formed into a discharge cone 16 leading into a discharge pocket 18 having a gate 20 at its lower end through which the coke or other material may be finally removed from the apparatus.

The plate 12 is spaced from the wall of the section 14 and lies below the lower edge of the shell 10 whereby coke or the like may pass around its outer edge and drop into the cone section 16. Plate 12 moreover, has a central opening 22 through which material may be discharged downwardly into the section 16. The cone-like section 16 is not coaxial with the shell 10 and, according to the present invention, a rotatable shaft 24 extends vertically upward from beneath the cone 16 in the vertical axis of the shell 10 passing through the wall of cone 16 at a point 26 and extending upwardly through the opening 22 to a point above the plate 12. The means according to the present invention for feeding the coke or the like off the plate 12 and into cone 16 includes a hollow truncated conical member 28 fixed to the upper end of shaft 24. The truncated member 28 has its axis inclined to the vertical but its lower edge 30 and upper truncated face 32 are horizontal. Moreover, the vertical line passing through the center of mass of member 28 is offset from or eccentric to the axis of shaft 24. According to the present invention means are provided for rotating the shaft 24. Owing to the shape of conical member 28 and its arrangement on shaft 24, it acts in general after fashion of an eccentric, stirring and loosening the material in the lower portion of the shell 10 and resting on the plate 12. Member 28 extends out horizontally over a greater area than that of the opening 22. The lower edge 30 of conical member 28, however, is spaced above plate 12 so that room is provided permitting coke readily to pass around the edge 30 and to discharge downwardly through opening 22. It is preferred, moreover, according to the present invention, to provide power operated pushers 34, 34 reciprocated by engines (not shown) connected to the rods 36, 36. Pushers 34, 34 reciprocate just above the plate 12 and assist the coke in moving outwardly to the edge of the plate 12 so as to fall over into the cone 16 or inwardly to the opening 22. The cone 28, however, when reciprocated according to the present invention is capable of discharging coke from the plate 12 without assistance from pushers or like mechanism and the pushers may be omitted if desired.

Shaft 24 is supported at its lower end on the outside of cone 16 by a suitable thrust bearing and means are provided, also on the outside of the cone 16, for rotating the shaft 24, thereby operating the conical member 28. Preferably the thrust bearing for the shaft 24 is combined with the rotating mechanism as will presently appear.

Fixed to the shaft 24 near its lower end by set screws 38, 38, Fig. 2, or other suitable means, is a sleeve 40 surrounding the shaft 24 and having at its upper end an outwardly extending horizontal flange 42 forming a portion of ratchet mechanism whereby the shaft and cone 28 are rotated. The sleeve 40 is illustrated in detail in Figs. 4 and 5 and it will be seen that the upper face of flange 42 is provided with a series of teeth 44, each of which has a vertical and an inclined face. Immediately above the sleeve 40 and flange 42 on the shaft 24 is a second sleeve 46. Sleeve 46 is free to turn on the shaft 24 and has at its lower end an outwardly extending horizontal flange 48, the lower face of which is provided with teeth formed complementary to and meshing with the teeth 44 of the flange 42, as indicated in Fig. 2. Flange 48 projects laterally beyond the flange 42 at two points on opposite sides of the shaft 24 and is there provided with trunnions 50. Trunnions 50 are swivelled respectively in the two arms of a horizontal yoke 52, one end of which is supported, at least in part, by the trunnions 50 and the other end of which is supported by a reciprocatory rod 54 which passes through the end of the yoke 52 opposite trunnions 50. Rod 54 is provided with collars 56, 56 on opposite sides of the yoke 52 whereby reciprocation of the rod 54 in a horizontal plane in which it lies serves to oscillate the yoke 52. Sufficient lost motion is provided between the rod 54 and collars 56 on the one side and the yoke 52 on the other to permit the yoke to oscillate readily without binding on the rod or the collars. Suitable valve mechanism (not shown) is associated with power cylinder 58 whereby the piston within this cylinder and the shaft 54 to which the piston is connected are caused to reciprocate slowly.

It will be clear from the construction of the teeth on flanges 42 and 48 that oscillation or reciprocation of the yoke 52 around the shaft 24 will cause shaft 24 and conical member 28 to rotate and thereby agitate the coke in bottom of shell 10. When flange 48 is moving in one direction, however, the sleeve 40 and the shaft 24 remain stationary, the inclined faces of the teeth on flanges 42 and 48 sliding over each other without causing any driving action as in the ordinary operation of ratchet members during the idle stroke. Owing to weight of yoke 52, sleeve 46 and flange 48, when the tips or points of the teeth pass by each other the sleeve 46 would, unless means were provided to prevent it, immediately fall heavily downward for the distance equal to the vertical side of the teeth 44. Such repeated falling of the yoke 52, sleeve 46 and flange 48 would produce a disagreeable noise as well as a severe pounding action and rapid wear on the ratchet teeth. In order to prevent these difficulties, according to the present invention, the end of yoke 52 near the shaft 24 is connected to a supporting dash-pot mechanism. For this purpose, as illustrated in Figs. 2 and 3, the sides of yoke 52 are connected near the trunnions 50 by a crossbar or beam 60. At the center of the crossbar 60 it is connected to the upper end of a rod 62, which is connected in turn to a piston (not shown) operating in the usual manner in the dashpot cylinder 64. The ends of dashpot cylinder 64 are connected by pipes 66, 66 having valves therein to permit the gradual passage of liquid from one end of the cylinder 64 to the other in the usual manner. The arrangement of the dashpot piston is such that it can be lifted readily by the yoke 52 when the one end of the yoke is raised by the inclined faces of the teeth on flanges 42 and 48, but opposes a resistance to the passage of liquid therethrough when the weight of the yoke 52 and connected parts tends to force the piston connected to the rod 62 downwardly in cylinder 64. The trunnion end of the yoke 52 is consequently supported momentarily after each disengagement of the ratchet teeth 44 with the co-operating teeth on flange 48 during the idler stroke of the yoke 42 and the teeth on flange 48 are thereby prevented from striking forcibly against the teeth 44. Noise and severe wear during the operation of the ratchet mechanism are thereby prevented.

At the lower end of sleeve 40 is a second horizontal flange 68, contacting with a stationary flange 70 mounted in a suitable support at the lower end of shaft 24. Flanges 68 and 70 cooperate to form a thrust bearing for the shaft 24 supporting its weight and that of the conical member 28 together with the column of coke or fuel and the like weighing on the member 28. Flange 70 is fixed to a sleeve 72 which serves as a guide bearing at the lower end of shaft 24 and a second guide bearing 74 for the shaft 24 is preferably provided at the point at which shaft 24 passes through the wall of cone 16, the fixed portion of bearing 74 being secured to the wall of cone 16.

As the coke or other material pressing on conical member 28 is at a considerable temperature, member 28 is formed hollow as indicated at 76, the shaft 24 being also hollow as illustrated. Cooling water is or may be introduced into the space 76 in member 28 through a vertical pipe 78 extending upwardly through the shaft 24, water so introduced into members 28 and 24 being removed through a larger pipe 80 surrounding the pipe 78 and passing a short distance into the lower end of shaft 24 through a gland member 82, closing the lower end of pipe 24.

In order to prevent unnecessary friction, to prevent dirt and grit from getting into bearing 74, and to prevent couplings or projections on the shaft 24 from catching in the coke, the portion of shaft 24 within cone 16 and section 14 is enclosed within a housing 84 at the upper end of which is a third guide bearing 86 for the shaft 24.

Having thus described my invention, I claim:

1. In discharging apparatus, a rotatable shaft, and a ratchet mechanism for operating said shaft comprising a member fixed to said shaft, a member loosely mounted on said shaft, means whereby said members operate said shaft in a given direction when said loosely mounted member is oscillated, said means producing a movement of said loosely mounted member longitudinally of said shaft, a power operated yoke for oscillating said loosely mounted member, and dashpot means attached to said yoke near said loosely mounted member and arranged to prevent pounding of said fixed and loosely mounted members during the operating of the ratchet mechanism.

2. In discharging apparatus, an agitator, a shaft for rotating said agitator, and a sleeve rigidly fixed to said shaft, said sleeve having a flange at one end provided with ratchet teeth whereby the shaft may be rotated and having a flange at its other end serving to support the weight of the shaft and agitator.

3. In a gas generator, a discharging apparatus comprising an agitator, a vertical shaft connected to said agitator, a discharging cone below said agitator into which material is fed by said agitator, said shaft passing downwardly from said agitator through said cone, and a housing fixed to said cone and extending upwardly therefrom around said shaft.

4. In a shaft generator, a discharging apparatus comprising a stationary plate adapted to support a charge of material, a movably mounted charge agitating member spaced a short distance above said plate, power operated mechanism for operating said agitator, a pusher movably mounted above said plate and below said agitator and adapted to co-operate with said agitator in working said charge material off said plate, and power operated means for reciprocating said pusher.

5. In a shaft generator a discharging apparatus comprising a plate adapted to support a charge of material, said plate having a central aperture, a movably mounted charge agitating member located above said plate and overlapping said aperture, said agitator being eccentrically mounted on a rotatable vertical shaft, a power operated pusher movably mounted above said plate and arranged to co-operate with said agitator in working material to be discharged toward and over the outer edge of said plate and toward said aperture, and power operated means for reciprocating said pusher.

6. In a shaft generator, a discharge apparatus comprising a stationary centrally apertured circular plate spaced from the inner wall of the generator and adapted to support a charge of material, a rotatable cone-shaped charge agitator movably mounted above said plate, power operated mechanism including a rotary driving shaft for operating said agitator, said agitator being mounted eccentrically and having its axis inclined to that of said shaft, and additional power operated reciprocatory means movably mounted on the top of said plate and arranged to co-operate with said agitator in causing a charge of material to pass said plate.

In testimony whereof I affix my signature.

HARVEY H. WONNING.